United States Patent
Shinkawa et al.

(10) Patent No.: US 12,037,664 B2
(45) Date of Patent: Jul. 16, 2024

(54) IRON ALLOY MANUFACTURING METHOD

(71) Applicant: HONDA MOTOR CO., LTD., Tokyo (JP)

(72) Inventors: Masaki Shinkawa, Saitama (JP); Kazuo Kikawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 132 days.

(21) Appl. No.: 17/341,615

(22) Filed: Jun. 8, 2021

(65) Prior Publication Data

US 2021/0388473 A1    Dec. 16, 2021

(30) Foreign Application Priority Data

Jun. 10, 2020  (JP) .................................. 2020-100948

(51) Int. Cl.
*C22C 33/02*    (2006.01)
*C21D 6/00*     (2006.01)
*C22C 38/04*    (2006.01)

(52) U.S. Cl.
CPC .......... *C22C 33/0207* (2013.01); *C21D 6/005* (2013.01); *C22C 38/04* (2013.01); *C21D 2211/001* (2013.01)

(58) Field of Classification Search
CPC .... B22F 10/20; B22F 10/30; B22F 2003/248; B33Y 10/00; B33Y 80/00; C21D 2211/001; C21D 2211/008; C21D 6/005; C22C 33/0207; C22C 38/04; Y02P 10/25
See application file for complete search history.

(56) References Cited

U.S. PATENT DOCUMENTS 8,999,222 B2 *   4/2015   Abe ..................... B23P 15/00
                                                   264/572
2019/0061001 A1   1/2019   Araie et al.
2019/0375013 A1*  12/2019  Matsumoto ............. B22F 12/70

FOREIGN PATENT DOCUMENTS

| CN | 109622954 A | 4/2019 |
|---|---|---|
| JP | 6295001 B1 | 3/2018 |
| JP | 2019-147992 A | 9/2019 |
| JP | 2019-210490 A | 12/2019 |

OTHER PUBLICATIONS

Office Action dated Nov. 24, 2022, issued in corresponding Chinese Patent Application No. 202110638355.3.
Search Report dated Nov. 17, 2022, issued in corresponding Chinese Patent Application No. 202110638355.3.
Notice of Reasons for Refusal dated Sep. 6, 2023 corresponding to Japanese Patent Application No. 2020-100948, with English translation thereof.

* cited by examiner

*Primary Examiner* — Jenny R Wu
(74) *Attorney, Agent, or Firm* — SQUIRE PATTON BOGGS (US) LLP (57) ABSTRACT

An iron alloy manufacturing method which can suppress occurrence of distortion and crack in formed iron alloy layers is provided. During execution of a forming step, in a first temperature control step, an iron alloy layer temperature T1 of a predetermined number of laminated layers from a surface layer of iron alloy layers formed in the forming step is controlled to be kept within a range of $Ms \leq T1 \leq Ms+\alpha$, and in a second temperature control step, a base plate temperature T2 is controlled to be kept within a range of $Mf-\beta \leq T2 \leq Mf$.

7 Claims, 7 Drawing Sheets

| | ADDITIVE MANUFACTURING CONDITION | | TEST RESULT | |
|---|---|---|---|---|
| | IRON ALLOY LAYER TEMPERATURE T1 (°C) | BASE PLATE TEMPERATURE T2 (°C) | HARDNESS (HV) | CRACK |
| EXAMPLE | 290°C | 150°C | 820±15 | NO |
| COMPARATIVE EXAMPLE 1 | 400°C | 150°C | 680±50 | NO |
| COMPARATIVE EXAMPLE 2 | 160°C | 150°C | 625±220 | YES |
| COMPARATIVE EXAMPLE 3 | 280°C | 200°C | 570±255 | NO |

IRON ALLOY MANUFACTURING METHOD

BACKGROUND OF THE INVENTION

Field of the Invention

The present invention relates to an iron alloy manufacturing method in which an iron alloy is manufactured with a metal additive manufacturing method.

Description of the Related Art

A conventionally known iron alloy manufacturing method is disclosed in Japanese Patent No. 6295001. In this manufacturing method, raw material powder is melted by laser light in an inert atmosphere so that an iron alloy layer is laminated and formed on a bottom surface of a material containing part. At this time, one or a plurality of iron alloy layers is formed and then heated by an infrared heater or the like such that the temperature of the iron alloy layer(s) changes in the order of a first temperature, a second temperature, and the first temperature.

The first temperature is set to a temperature higher than the second temperature and equal to or more than a martensitic transformation finish temperature Mf, and the second temperature is set to a temperature equal to or less than the martensitic transformation finish temperature Mf. The above heating causes martensitic transformation in the iron alloy layer(s), and the iron alloy layer(s) changes into a martensitic structure.

SUMMARY OF INVENTION

According to the conventional iron alloy manufacturing method, the formed iron alloy layer(s) is rapidly cooled and then changes into a martensitic structure; therefore, its heat shrinkage generated at the time of martensitic transformation becomes larger than its volume expansion, which may generate distortion or crack. In addition, in the case where additive manufacturing of an iron alloy is further performed on the martensitic structure, a problem may occur in which because of tempering, the hardness of the iron alloy greatly fluctuates along the lamination direction.

The present invention has been made to solve the problems, and an object of the present invention is to provide an iron alloy manufacturing method which can suppress occurrence of distortion and crack in formed iron alloy layers.

SUMMARY OF THE INVENTION

To achieve the object, the invention according to claim 1 is an iron alloy manufacturing method in which an iron alloy is manufactured with a metal additive manufacturing method, and the iron alloy manufacturing method includes a forming step of laminating and forming iron alloy layers on a base, by irradiating raw material powder of the iron alloy with either a laser beam or an electron beam and melting the raw material powder; a first temperature control step of, during execution of the forming step, controlling an iron alloy layer temperature T1 of a predetermined number of laminated layers from a surface layer of the iron alloy layers formed in the forming step such that the iron alloy layer temperature T1 is kept within a range of $Ms \leq T1 \leq Ms+\alpha$ where Ms is a martensitic transformation start temperature and $\alpha$ is a predetermined value; and a second temperature control step of, during execution of the forming step, controlling a temperature T2 of the base such that the temperature T2 of the base is kept within a range of $Mf-\beta \leq T2 \leq Mf$ where Mf is a martensitic transformation finish temperature and $\beta$ is a predetermined value.

According to the iron alloy manufacturing method, in the forming step, the iron alloy layers are laminated and formed on the base by irradiating the raw material powder of the iron alloy with either the laser beam or the electron beam and melting the raw material powder. During execution of the forming step, in the first temperature control step, the iron alloy layer temperature T1 of the predetermined number of the laminated layers from the surface layer of the iron alloy layers formed in the forming step is controlled to be kept within the range of $Ms \leq T1 \leq Ms+\alpha$. Accordingly, the predetermined number of the laminated layers from the surface layer of the iron alloy layers formed in the forming step, after exceeding the austenitic transformation temperature due to melting of the raw material powder, until melting of the raw material powder occurs in the vicinity in forming the next metal layer, remains an austenitic structure without changing into a martensitic structure and is brought into the state of not being subjected to tampering transformation while reducing heat distortion.

Then, when melting of the raw material powder occurs in the vicinity, the predetermined number of the inner metal layers is immediately cooled after temporarily increasing in temperature, and thus pearlite transformation occurs at a part of the structure, while the rest of the structure remains an austenitic structure. Furthermore, in association with the progress of the forming step, a layer exceeding the predetermined number of the layers from the surface layer is controlled in the second temperature control step such that the temperature T2 of the base is kept within the range of $Mf-\beta \leq T2 \leq Mf$, and thus the layer gradually changes from an austenitic structure into a martensitic structure. This suppresses occurrence of distortion and crack in the formed iron alloy layers, so that a uniform and high-strength martensitic structure can be obtained.

The invention according to claim 2 is the iron alloy manufacturing method according to claim 1, wherein in the second temperature control step, when room temperature is higher than the martensitic transformation finish temperature Mf, the temperature T2 of the base is controlled such that the temperature T2 of the base is kept at the room temperature.

According to the iron alloy manufacturing method, in the second temperature control step, when room temperature is higher than the martensitic transformation finish temperature Mf, the temperature T2 of the base is controlled such that the temperature T2 of the base is kept at the room temperature. Accordingly, when room temperature is higher than the martensitic transformation finish temperature Mf due to the composition of the iron alloy or the like, the predetermined number of the laminated layers from the surface layer of the iron alloy layers formed in the forming step remains an austenitic structure and is brought into the state of not being subjected to tampering transformation while reducing heat distortion. This suppresses occurrence of distortion and crack in the formed iron alloy layers, so that a uniform and high-strength martensitic structure can be obtained.

The invention according to claim 3 is the iron alloy manufacturing method according to claim 1 or 2, wherein the value of $\alpha$ is a value within a range of 0 to 50° C.

According to the iron alloy manufacturing method, in the first temperature control step, the iron alloy layer temperature T1 is controlled to be kept within a range of Ms to Ms+50° C. In the case where it is thus controlled, it has been confirmed through an experiment conducted by the applicant of the present application that the predetermined number of the laminated layers from the surface layer of the iron alloy layers formed in the forming step, after exceeding the austenitic transformation temperature due to melting of the raw material powder in the forming step, until melting of the raw material powder occurs in the vicinity in the next forming step, can remain an austenitic structure without changing into a martensitic structure (see FIG. 8 described later). Accordingly, the operations and effects as described above can be obtained reliably.

The invention according to claim 4 is the iron alloy manufacturing method according to any of claims 1 to 3, wherein the value of β is a value within a range of 0 to 50° C.

According to the iron alloy manufacturing method, in the second temperature control step, the temperature T2 of the base is controlled to be kept within a range of Mf–50 to Mf. In the case where it is thus controlled, it has been confirmed through an experiment conducted by the applicant of the present application that the layer exceeding the predetermined number of the layers from the surface layer gradually changes from an austenitic structure into a martensitic structure, and thus occurrence of distortion and crack can be suppressed in the formed iron alloy layers (see FIG. 8 described later). Accordingly, the operations and effects as described above can be obtained reliably.

DETAILED DESCRIPTION OF THE PREFERRED EMBODIMENT

Hereinafter, an iron alloy manufacturing method according to an embodiment of the present invention will be described with reference to the drawings. The present embodiment uses a metal additive manufacturing apparatus 1 illustrated in FIG. 1 to manufacture an iron alloy product with the iron alloy manufacturing method described below.

Figure 1:
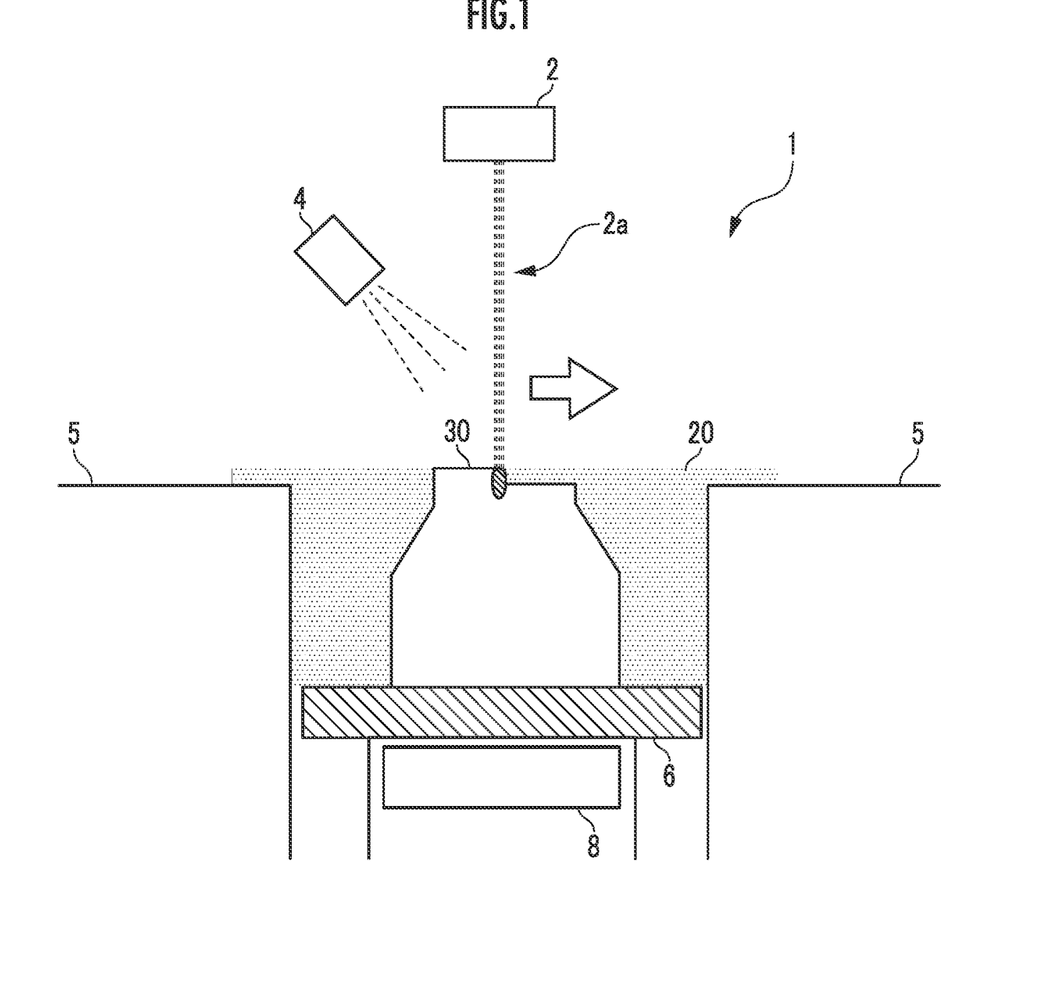
FIG. 1 is a view illustrating a configuration of a metal additive manufacturing apparatus that performs an iron alloy manufacturing method according to an embodiment of the present invention.
Figure 2:
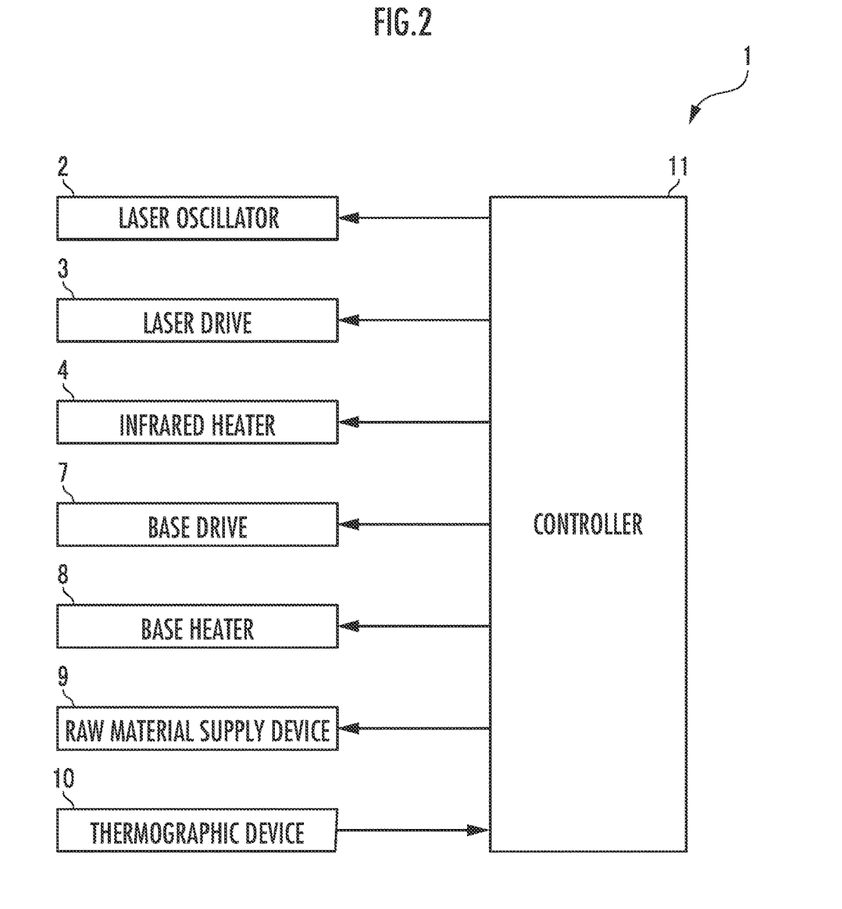
FIG. 2 is a block diagram illustrating an electrical configuration of the metal additive manufacturing apparatus.

The metal additive manufacturing apparatus 1 uses a powder bed method and comprises, as illustrated in FIGS. 1 and 2, a laser oscillator 2, a laser drive 3, an infrared heater 4, a powder container 5, a base plate 6, a base drive 7, a base heater 8, a raw material supply device 9, a thermographic device 10, a controller 11, and the like.

The laser oscillator 2 is disposed above the powder container 5 and is controlled by the controller 11 during execution of a forming step described later so that raw material powder 20 on the base plate 6 (base) in the powder container 5 is irradiated with a laser beam 2a. The raw material powder 20 thereby melts, forming an iron alloy.

Furthermore, the laser drive 3 is formed by a combination of an electric motor, a gear mechanism (both not illustrated), and the like. The laser drive 3 is electrically connected to the controller 11 and is controlled by the controller 11 during execution of the forming step described later so that the laser oscillator 2 is driven in an X-axis direction and a Y-axis direction in a plane parallel to an upper surface of the base plate 6. Thus, iron alloy layers are laminated in the forming step described later, and an iron alloy product 30 can be formed on the base plate 6.

Furthermore, the infrared heater 4 is electrically connected to the controller 11, and during execution of a first temperature control step described later, output of the infrared heater 4 is controlled by the controller 11 to control an iron alloy layer temperature T1. The iron alloy layer temperature T1 is, where a top iron alloy layer of the iron alloy product is defined as a first layer and layers therebelow are sequentially defined as a second layer, a third layer, . . . , a temperature of the first to third layers.

The thermographic device 10 detects infrared energy output by the first to third layers and outputs a detection signal to the controller 11. As described later, in the first temperature control step, the controller 11 acquires the iron alloy layer temperature T1 based on the detection signal of the thermographic device 10 and controls the iron alloy layer temperature T1 via the infrared heater 4.

The powder container 5 is formed of a material having heat resistance and has a plan-view rectangular internal space whose bottom is the base plate 6. In the forming step, the raw material powder is placed on the upper surface of the base plate 6 and in the internal space of the powder container 5.

The base drive 7 is for driving the base plate 6 in the up-down direction and is formed by a combination of an electric motor, a gear mechanism (both not illustrated), and the like. The base drive 7 is electrically connected to the controller 11 and is controlled by the controller 11 in a base driving step described later so that the base plate 6 is moved downward by a predetermined distance d.

The base heater 8 is electrically connected to the controller 11, and as described later, during execution of a second temperature control step, output of the base heater 8 is controlled by the controller 11 to control a temperature T2 of the base plate 6 (hereinafter referred to as a "base plate temperature").

The raw material supply device 9 is a combination of an actuator, a gear mechanism, and the like and is electrically connected to the controller 11. The raw material supply device 9 supplies the raw material powder 20 to the powder container 5 in a raw material supply step as described later.

Figure 3:
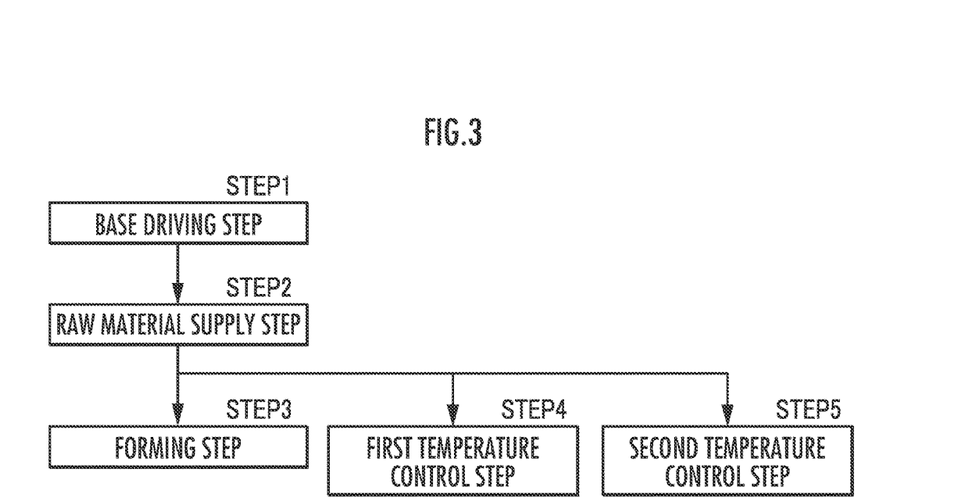
FIG. 3 is a diagram illustrating steps in the iron alloy manufacturing method.
Figure 4A:
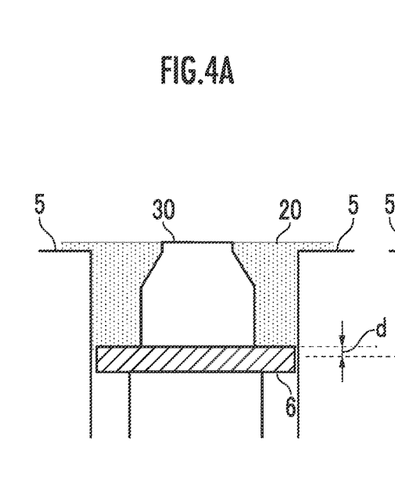
FIG. 4A is a view for describing operations of the steps in the iron alloy manufacturing method.
Figure 4B:
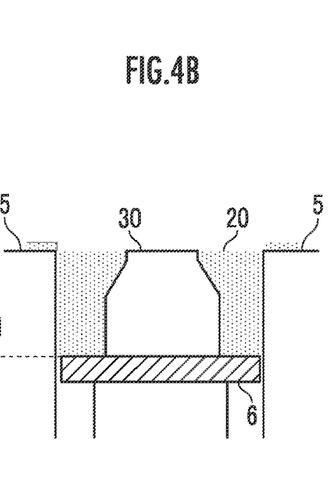
FIG. 4B is a view for describing operations of the steps in the iron alloy manufacturing method.

Next, the iron alloy manufacturing method performed by the metal additive manufacturing apparatus 1 will be described. As illustrated in FIG. 3, in the manufacturing method, the base driving step (STEP 1 in FIG. 3) is first executed. In the base driving step, in order to form one iron alloy layer on the iron alloy product 30 being formed, the base drive 7 moves the base plate 6 downward by the one iron alloy layer. For example, the base plate 6 moves by the distance d from a position of FIG. 4A to a position of FIG. 4B.

Figure 4C:
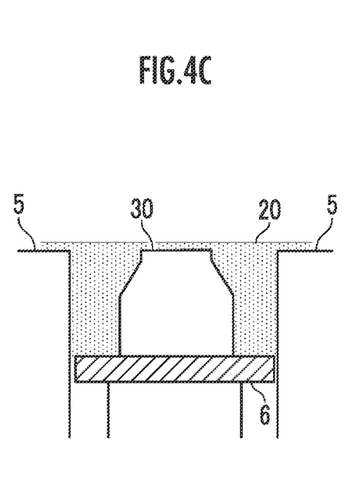
FIG. 4C is a view for describing operations of the steps in the iron alloy manufacturing method.

Next, the raw material supply step (STEP 2 in FIG. 3) is executed. In the raw material supply step, the raw material powder 20 for the one iron alloy layer is supplied to the powder container 5 by the raw material supply device 9. For example, as illustrated in FIG. 4C, when the iron alloy product 30 being created is present in the powder container 5, the raw material powder 20 for the one iron alloy layer is supplied onto the iron alloy product 30.

Following the raw material supply step, the forming step, the first temperature control step, and the second temperature control step (STEPS 3 to 5 in FIG. 3) are executed simultaneously.

Figure 4D:
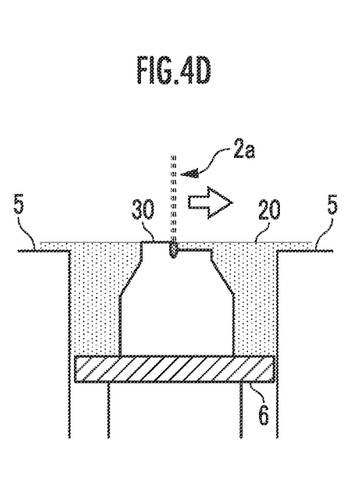
FIG. 4D is a view for describing operations of the steps in the iron alloy manufacturing method.

In the forming step, a space including the laser oscillator 2, the raw material powder 20, the powder container 5, and the like is kept under an inert atmosphere. Then, the laser oscillator 2 is controlled by the controller 11 in this state so that the laser oscillator 2 irradiates the raw material powder 20 on the base plate 6 in the powder container 5 with the laser beam 2a. At the same time, the laser drive 3 is controlled by the controller 11 so that the laser drive 3 drives the laser oscillator 2 to move within a predetermined range. As illustrated in FIG. 4D, when the iron alloy product 30 being created is present in the powder container 5, the raw material powder 20 above the iron alloy product 30 thereby melts, and accordingly the one iron alloy layer is laminated on an upper surface of the iron alloy product 30.

In the first temperature control step, output of the infrared heater 4 is controlled such that the iron alloy layer temperature T1 described above becomes a value which satisfies the following formula (1). The reason for this will be described later.

$$Ms \leq T1 \leq Ms+\alpha \qquad (1)$$

Here, Ms represents a martensitic transformation start temperature and α represents a predetermined value.

In the second temperature control step, output of the base heater 8 is controlled such that the base plate temperature T2 described above becomes a value which satisfies the following formula (2). The reason for this will be described later.

$$Mf-\beta \leq T2 \leq Mf \qquad (2)$$

Here, Mf represents a martensitic transformation finish temperature and represents a predetermined value.

As above, the forming step, the first temperature control step, and the second temperature control step are executed simultaneously, and in the forming step, at the timing at which the one iron alloy layer is laminated on the upper surface of the iron alloy product 30, the forming step and the like finish. Thereafter, until completion of the iron alloy product 30, each of the steps is repeatedly executed in the order of the base driving step, the raw material supply step, and the forming step and the first and second temperature control steps.

Figure 5:
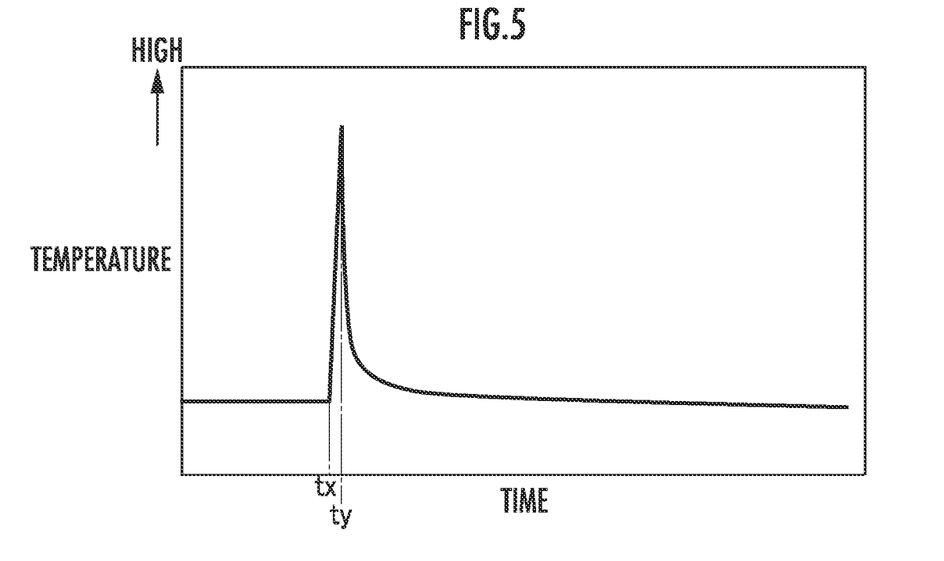
FIG. 5 is a diagram illustrating a temperature change in raw material powder and an iron alloy when the iron alloy is formed.

Next, as described above, the reasons why the iron alloy layer temperature T1 and the base plate temperature T2 are controlled in the first temperature control step and the second temperature control step will be described. First, it has been confirmed through an experiment conducted by the applicant of the present application that when an iron alloy is formed by the metal additive manufacturing apparatus 1, the temperature of the raw material powder and the iron alloy changes as illustrated in FIG. 5.

As illustrated in the figure, when the raw material powder is irradiated with the laser beam 2a and thereby melts, the temperature rapidly increases after a time tx. Then, after a melted portion reaches the maximum temperature at a time ty, in association with the movement of the laser beam 2a, the temperature of the melted portion decreases due to its heat conduction to a portion already solidified. Thus, it has been found that when an iron alloy is formed by the metal additive manufacturing apparatus 1, the temperature of the raw material powder and the iron alloy changes as above.

Based on this finding, in order to obtain a uniform and high-strength martensitic structure in the iron alloy layers after melting of the raw material powder, the iron alloy layer temperature T1 and the base plate temperature T2 are controlled in the first temperature control step and the second temperature control step so as to become the temperatures within the ranges described above.

Figure 6:
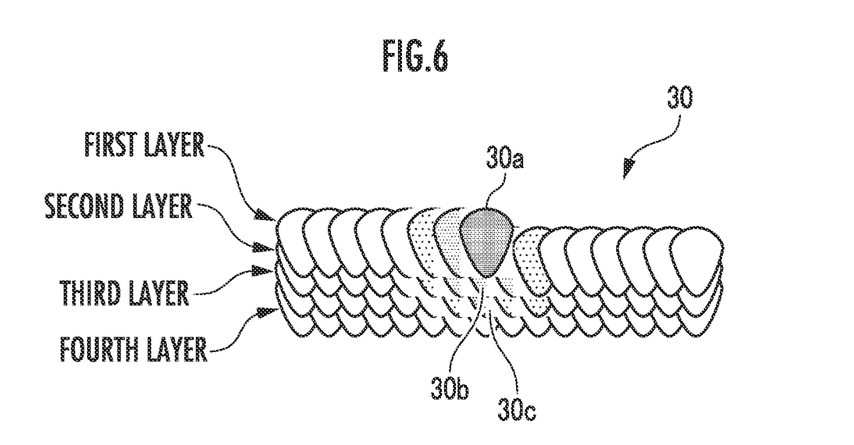
FIG. 6 is a view for describing a temperature change in iron alloy layers.

In the case where the iron alloy layer temperature T1 and the base plate temperature T2 are thus controlled, when, for example, the first to fourth layers of the iron alloy layers in the iron alloy product 30 are formed during the forming step as illustrated in FIG. 6, the temperatures of these iron alloy layers change as follows. In the following description, the iron alloy layer temperature T1 is controlled to be a value Ms+α and the base plate temperature T2 is controlled to be a value Mf−β.

Figure 7:
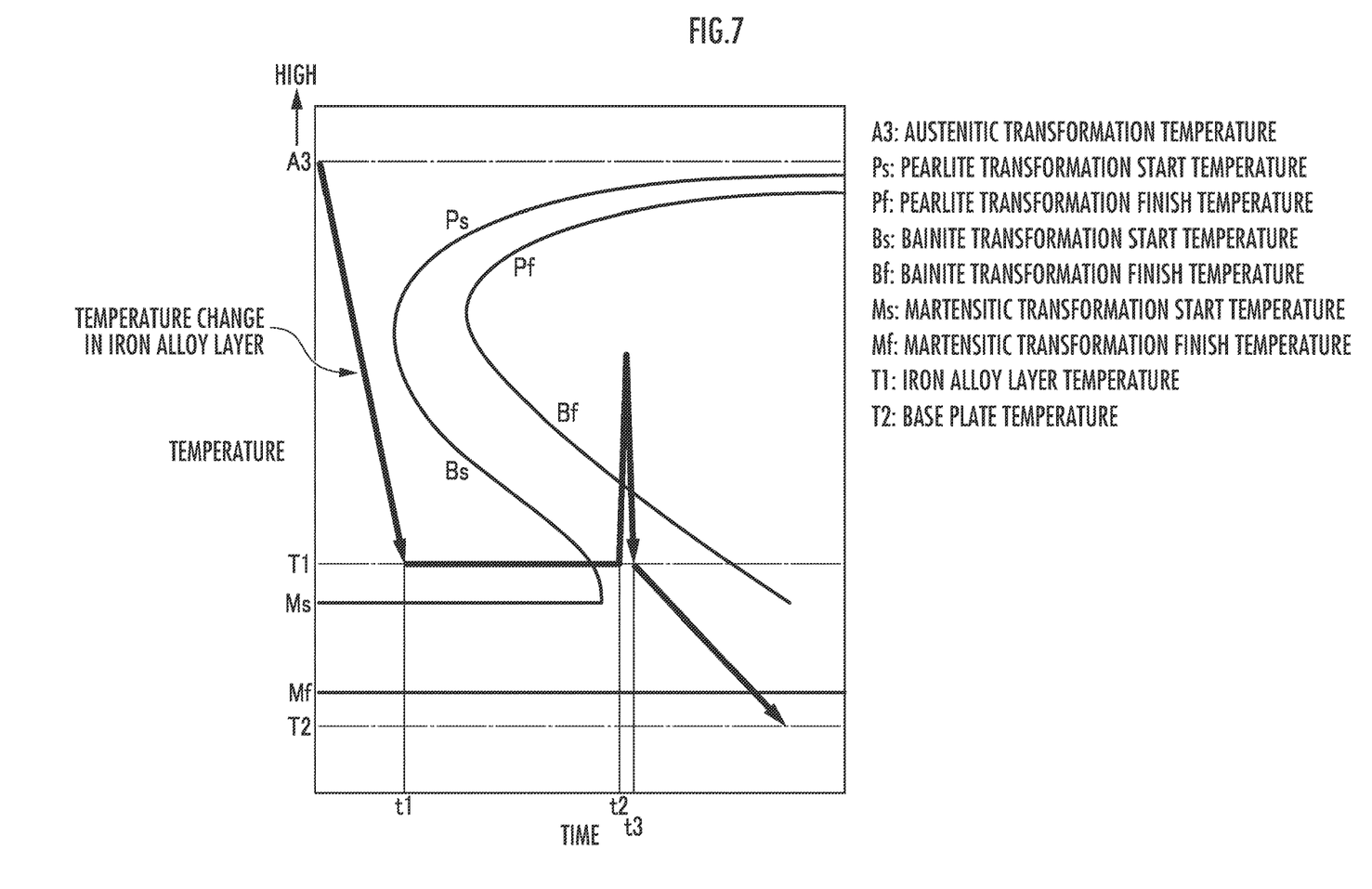
FIG. 7 is a diagram in which the temperature change in the iron alloy layers is superimposed on an isothermal transformation curve diagram of the iron alloy.

First, the temperature of a portion 30a of the first layer immediately after formed by irradiation with the laser beam 2a increases to a temperature higher than an austenitic transformation temperature A3 and, in association with the movement of the laser beam 2a toward the right side in FIG. 6, rapidly decreases from the austenitic transformation temperature A3 to the iron alloy layer temperature T1 (time t1) as illustrated in FIG. 7.

Thereafter, the temperature of the first layer including the portion 30a is kept at the iron alloy layer temperature T1 by execution of the first temperature control step. As a result, the first iron alloy layer remains an austenitic structure without changing into a martensitic structure.

The temperature of the second layer below the first layer is kept at the iron alloy layer temperature T1 by execution of the first temperature control step, while the temperature of a portion 30b of the second layer, due to its heat conduction when the portion 30a of the first layer thereabove is formed, increases to a temperature equal to or more than the austenitic transformation temperature A3 as described above.

Thereafter, in association with the movement of the laser beam 2a toward the right side in FIG. 6, the temperature of the portion 30b of the second layer rapidly decreases from the austenitic transformation temperature A3 to the iron alloy layer temperature T1 (time t1). Thereafter, the temperature of the second layer including the portion 30b is kept at the iron alloy layer temperature T1 by execution of the first temperature control step. As a result, similarly to the first layer, the second iron alloy layer also remains an austenitic structure without changing into a martensitic structure.

The temperature of the third layer below the second layer is kept at the iron alloy layer temperature T1 by execution of the first temperature control step, while the temperature of a portion 30c of the third layer, due to its heat conduction when the portion 30a of the first layer is formed thereabove, temporarily increases to a temperature lower than the austenitic transformation temperature A3 between times t2 and t3 of FIG. 7. This causes pearlite transformation at a part of the third layer, while the rest of the third layer remains an austenitic structure as the temperature increase time is short.

Thereafter, in association with the movement of the laser beam 2a toward the right side in FIG. 6, the base plate 6 is kept at the base plate temperature T2 by execution of the second temperature control step, so that after the time t3, the temperature of the portion 30c of the third layer and the like gradually decreases toward the base plate temperature T2. As a result, substantially the entire third iron alloy layer gradually changes from an austenitic structure into a martensitic structure. Similarly, the fourth and subsequent iron alloy layers also gradually change from an austenitic structure into a martensitic structure.

Next, test data on the iron alloy manufactured with the manufacturing method of the present embodiment will be described with reference to FIG. 8. In the figure, the "EXAMPLE" indicates data on an iron alloy of 10 mm square manufactured with the manufacturing method of the present embodiment using the raw material powder 20 having a ratio of Fe of 98.20 (wt %), C of 0.62 (wt %), and Mn of 1.1 (wt %).

In the case of using this raw material powder 20, as long as the martensitic transformation start temperature Ms is 255° C. and the martensitic transformation finish temperature Mf is 178° C., the iron alloy layer temperature T1 is controlled to be 290° C. (=Ms+35° C.) in the first temperature control step, and the base plate temperature T2 is controlled to be 150° C. (=Mf−28° C.) in the second temperature control step.

A comparative example 1 is an example in the case where for comparison, in the first temperature control step, the iron alloy layer temperature T1 is controlled to be 400° C. (=Ms+145° C.), which is higher than Ms+100° C., and in the second temperature control step, the base plate temperature T2 is controlled to be 150° C., which is the same as in the example.

A comparative example 2 is an example in the case where for comparison, in the first temperature control step, the iron alloy layer temperature T1 is controlled to be 160° C. (=Ms−18° C.), which is lower than the martensitic transformation start temperature Ms, and in the second temperature control step, the base plate temperature T2 is controlled to be the same temperature (150° C.) as in the example.

A comparative example 3 is an example in the case where for comparison, in the first temperature control step, the iron alloy layer temperature T1 is controlled to be a slightly lower value (280° C.) than in the example, and in the second temperature control step, the base plate temperature T2 is controlled to be 200° C. (=Mf+22° C.), which is higher than the martensitic transformation finish temperature Mf.

First, it is understood from data in the comparative example 1 that the numerical value of the hardness is smaller than in the example. As a result of observation of the structure of the comparative example 1, there was a mixture of a bainite structure and a ferrite structure; accordingly, the above state is assumed to have occurred.

Furthermore, it is understood from data in the comparative example 2 that the numerical value of the hardness is smaller than in the example and crack has occurred. In addition to this, although not illustrated, variations in the hardness at the time of measurement were large. As a result of observation of the structure of the comparative example 2, a tempered martensitic structure was formed in layers; accordingly, the above state is assumed to have occurred.

Furthermore, with reference to data in the comparative example 3, it is understood that the numerical value of the hardness is smaller than in the example. In addition to this, although not illustrated, variations in the hardness at the time of measurement were large. As a result of observation of the structure of the comparative example 3, there was a mixture of a martensitic structure, a bainite structure, and a ferrite structure; accordingly, the above state is assumed to have occurred.

In contrast, it is understood from data in the example that the numerical value of the hardness (the average value of the Vickers hardness) is larger than in the comparative examples 1 to 3 and no crack has occurred. Furthermore, although not illustrated, fluctuations in the hardness at the time of measurement were small. Furthermore, as a result of observation of the structure of the example, a martensitic structure was obtained; accordingly, the above state is assumed to have occurred.

As above, according to the iron alloy manufacturing method of the present embodiment, in the forming step, the iron alloy layers are laminated and formed on the base plate 6 by irradiating the raw material powder 20 of the iron alloy with the laser beam 2a and melting the raw material powder 20. During execution of the forming step, in the first temperature control step, the iron alloy layer temperature T1 of the first to third layers of the iron alloy layers formed in the forming step is controlled to be kept within the range of Ms≤T1≤Ms+α. Accordingly, a predetermined number of laminated layers from a surface layer of the iron alloy layers formed in the forming step, after exceeding the austenitic transformation temperature due to melting of the raw material powder 20, until melting of the raw material powder occurs in the vicinity in forming the next metal layer, remains an austenitic structure without changing into a martensitic structure and is brought into the state of not being subjected to tampering transformation while reducing heat distortion.

Then, when melting of the raw material powder 20 occurs in the vicinity, the predetermined number of the inner metal layers is immediately cooled after temporarily increasing in temperature, and thus pearlite transformation occurs at a part of the structure, while the rest of the structure remains an austenitic structure. Furthermore, in association with the progress of the forming step, a layer exceeding the predetermined number of the layers from the surface layer is controlled in the second temperature control step such that the base plate temperature T2 is kept within the range of Mf−β≤T2≤Mf, and thus the layer gradually changes from an austenitic structure into a martensitic structure. This suppresses occurrence of distortion and crack in the formed iron alloy layers, so that a uniform and high-strength martensitic structure can be obtained.

Figure 8:
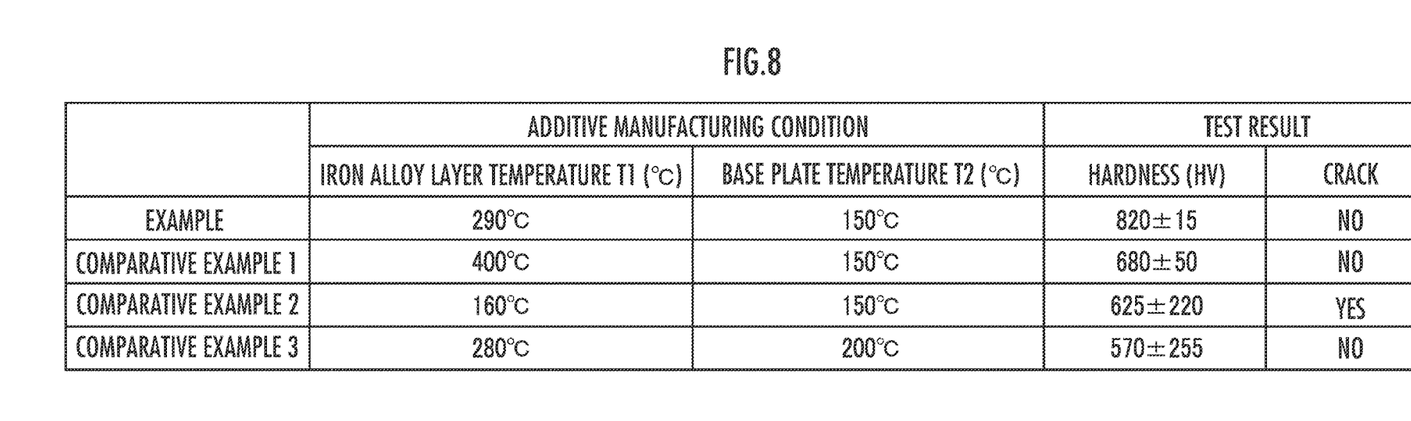
FIG. 8 is a diagram illustrating data on the iron alloy in an example and comparative examples.

Although the data in the example of FIG. 8 is an example in which in the first temperature control step, the iron alloy layer temperature T1 is controlled to be a value Ms+35° C., not limited to this, it is sufficient that in the first temperature control step, the iron alloy layer temperature T1 is controlled to be a value which satisfies the formula (1) described above. In this case, the value α is preferably set to a value within a range of 0 to 50° C. This is because when the iron alloy layer temperature T1 exceeds Ms+50, martensitic transformation does not occur, while ferrite transformation occurs, which makes it impossible to secure a high strength in the additive manufacturing. Furthermore, the value α is more preferably set to a value within a range of 0 to 20° C.

Furthermore, although the data in the example of FIG. 8 is an example in which in the second temperature control step, the base plate temperature T2 is controlled to be a value Mf−28° C., not limited to this, it is sufficient that in the second temperature control step, the base plate temperature T2 is controlled to be a value which satisfies the formula (2) described above. In this case, the value β is preferably set to a value within a range of 0 to 50° C. This is because when the base plate temperature T2 becomes a temperature less than Mf−50, it is difficult to maintain the iron alloy layer temperature T1 at a temperature higher than the martensitic transformation start temperature Ms. Furthermore, the value β is more preferably set to a value within a range of 20 to 40° C.

Furthermore, during execution of the second temperature control step, when room temperature is higher than the martensitic transformation finish temperature Mf, the base plate temperature T2 may be controlled such that the base plate temperature T2 is kept at the room temperature. When the base plate temperature T2 is thus controlled, the predetermined number of the laminated layers from the surface layer of the iron alloy layers formed in the forming step remains an austenitic structure and is brought into the state of not being subjected to tampering transformation while reducing heat distortion. Accordingly, similarly to the embodiment, a uniform and high-strength martensitic structure can be obtained.

Furthermore, although the data in the example of FIG. 8 is an example using the raw material powder 20 having the ratio of Fe of 98.20 (wt %), C of 0.62 (wt %), and Mn of 1.1 (wt %), the composition of the raw material powder is not limited to this and may be one mainly made of Fe and including at least one of C, Mn, Cr, and Ni.

Figure 9:
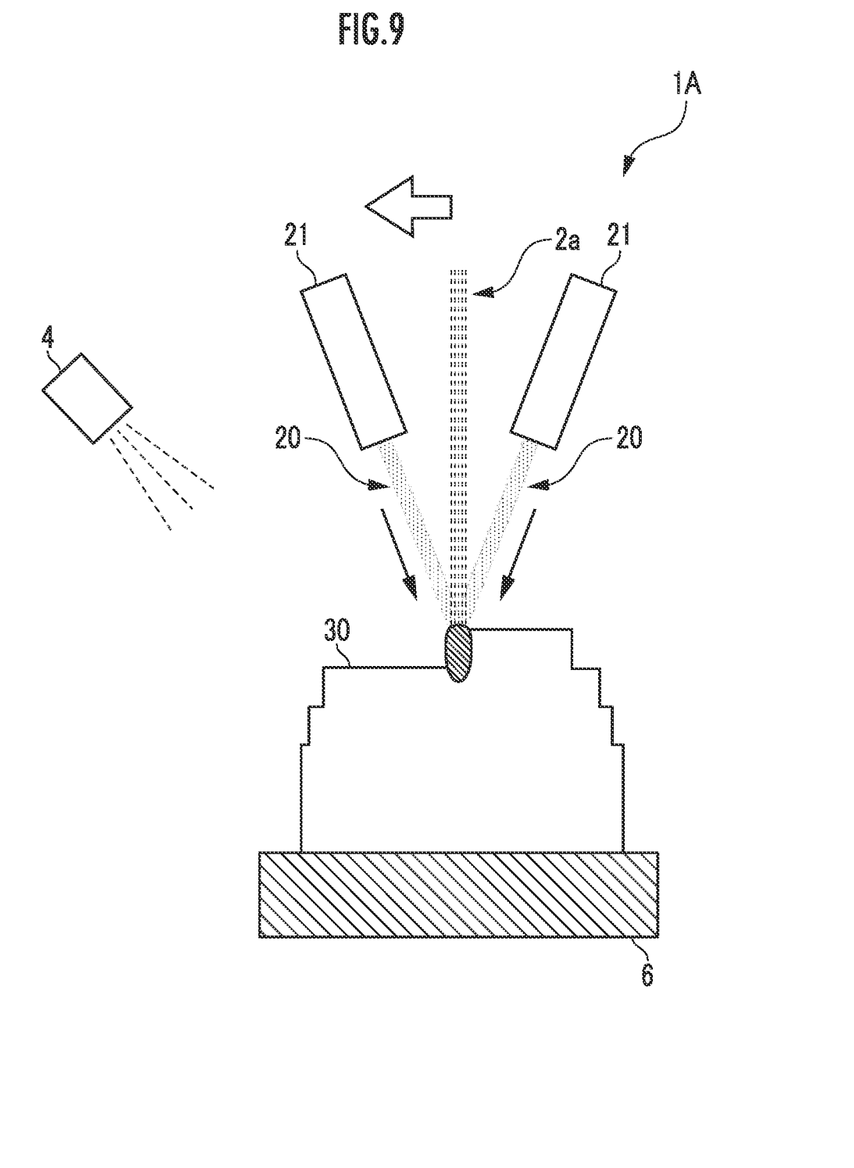
FIG. 9 is a view illustrating a metal additive manufacturing apparatus using a deposition method.

Although the embodiment is an example in which the metal additive manufacturing apparatus 1 using a powder bed method is employed, instead of this, a metal additive manufacturing apparatus 1A using a deposition method illustrated in FIG. 9 may be employed. In the metal additive manufacturing apparatus 1A, the raw material powder 20 is injected from two powder supply nozzles 21, it is melted by the laser beam 2a, and iron alloy layers are thereby laminated, forming the iron alloy product 30. Even in such a case where the metal additive manufacturing apparatus 1A is employed, the same manufacturing method as in the case where the metal additive manufacturing apparatus 1 of the embodiment is employed can be performed, and thereby the same operations and effects as in the embodiment can be obtained.

Furthermore, although the embodiment is an example in which the raw material powder 20 is melted by irradiation with the laser beam 2a, instead of this, the raw material powder 20 may be melted by irradiation with an electron beam.

Furthermore, although the embodiment is an example in which in the first temperature control step, the iron alloy layer temperature T1 is controlled by controlling the infrared heater 4, instead of this, a surface layer temperature T1 of the surface layer of the iron alloy to the third layer may be controlled with the laser beam 2a of the laser oscillator 2. In this case, after the raw material powder 20 is melted by laser beam irradiation and the first layer of the iron alloy is created from its one end to the other end, in the state where output of the laser oscillator 2 is reduced, the entire surface of the iron alloy is irradiated with the laser beam 2a so that the iron alloy layer temperature T1 is controlled so as to satisfy $Ms \leq T1 \leq Ms+\alpha$.

Although the embodiment is an example in which the iron alloy layer temperature T1 is a temperature of the first to third iron alloy layers, instead of this, the iron alloy layer temperature T1 may be a temperature of the first to second iron alloy layers, or the iron alloy layer temperature T1 may be a temperature of the first to n (n is an integer of four or more) iron alloy layers.

Furthermore, although the embodiment is an example in which the iron alloy product 30 is manufactured as the iron alloy, an iron alloy material or the like other than the iron alloy product 30 may be manufactured as the iron alloy.

REFERENCE SIGNS LIST 1 metal additive manufacturing apparatus
2 laser oscillator
2a laser beam
6 base plate (base)
20 raw material powder
30 iron alloy product

What is claimed is:

1. An iron alloy manufacturing method in which an iron alloy is manufactured with a metal additive manufacturing method, the iron alloy manufacturing method comprising:
   a base driving step of a base drive moving a base in a downward direction by a predetermined distance;
   a raw material supply step of a raw material supply device supplying raw material powder to a powder container with an iron alloy product being present in the powder container;
   a forming step of laminating and forming iron alloy layers on the base, by irradiating the raw material powder of the iron alloy with either a laser beam or an electron beam and melting the raw material powder;
   a first temperature control step of, during execution of the forming step, controlling an iron alloy layer temperature T1° C. of a predetermined number of laminated layers from a surface layer of the iron alloy layers formed in the forming step such that the iron alloy layer temperature T1° C. is kept within a range of Ms ° C.≤T1° C.≤Ms ° C.+α where Ms ° C. is a martensitic transformation start temperature and a is a predetermined value; and
   a second temperature control step of, during execution of the forming step, controlling a temperature T2° C. of the base such that the temperature T2° C. of the base is kept within a range of Mf ° C. β≤T2° C.≤Mf ° C. where Mf ° C. is a martensitic transformation finish temperature and β is a predetermined value, wherein
   the first temperature control step and the second temperature control step are executed simultaneously during execution of the forming step at a timing at which the iron alloy layers are laminated on an upper surface of the iron alloy product.

2. The iron alloy manufacturing method according to claim 1, wherein in the second temperature control step, when room temperature is higher than the martensitic transformation finish temperature Mf, the temperature T2 of the base is controlled such that the temperature T2 of the base is kept at the room temperature.

3. The iron alloy manufacturing method according to claim 1, wherein the value of a is a value within a range of 0 to 50° C.

4. The iron alloy manufacturing method according to claim 2, wherein the value of a is a value within a range of 0 to 50° C.

5. The iron alloy manufacturing method according to claim 1, wherein the value of β is a value within a range of 0 to 50° C.

6. The iron alloy manufacturing method according to claim 2, wherein the value of β is a value within a range of 0 to 50° C.

7. The iron alloy manufacturing method according to claim 3, wherein the value of β is a value within a range of 0 to 50° C.

* * * * *